US006962672B2

(12) United States Patent
Gauthier

(10) Patent No.: US 6,962,672 B2
(45) Date of Patent: Nov. 8, 2005

(54) PROCESS FOR THE PRODUCTION OF A HIGH PRESSURE VESSEL PARTICULARLY FOR A SPACE ENGINE AND VESSEL OBTAINED THERBY

(75) Inventor: Jack Gauthier, Vayres (FR)

(73) Assignee: EADS Launch Vehicles, Paris (FR)

( * ) Notice: Subject to any disclaimer, the term of this patent is extended or adjusted under 35 U.S.C. 154(b) by 0 days.

(21) Appl. No.: 10/150,021

(22) Filed: May 20, 2002

(65) Prior Publication Data

US 2002/0175168 A1    Nov. 28, 2002

(30) Foreign Application Priority Data

May 18, 2001    (FR) .................................. 01 06583

(51) Int. Cl.[7] ............................................ B29C 45/14
(52) U.S. Cl. ...................... 264/516; 220/588; 264/257; 264/258; 264/324
(58) Field of Search ........................ 204/564; 220/581, 220/586, 588–591, 592; 264/540, 103, 259, 264/541, 516, 257, 258, 324

(56) References Cited

U.S. PATENT DOCUMENTS

| 2,744,043 | A | * | 5/1956 | Ramberg .................... 156/155 |
| 3,031,099 | A | * | 4/1962 | Wiltshire ..................... 220/590 |
| 3,132,761 | A | * | 5/1964 | Sylvester ..................... 220/590 |
| 3,210,228 | A | * | 10/1965 | Bluck .......................... 156/172 |
| 3,282,757 | A | * | 11/1966 | Brussee ....................... 156/69 |
| 3,815,773 | A | * | 6/1974 | Duvall et al. ............... 220/590 |
| 4,243,075 | A | * | 1/1981 | McPherson et al. ........ 138/174 |
| 4,589,562 | A | * | 5/1986 | Fawley ........................ 220/590 |
| 4,690,295 | A | * | 9/1987 | Wills ........................... 220/590 |
| 4,740,262 | A | * | 4/1988 | Yavorsky et al. ........... 156/293 |
| 4,785,956 | A | * | 11/1988 | Kepler et al. ............... 220/590 |
| 5,429,845 | A | * | 7/1995 | Newhouse et al. ......... 428/34.1 |
| 5,494,188 | A | * | 2/1996 | Sirosh ......................... 220/590 |
| 5,562,934 | A | * | 10/1996 | Langos et al. ........... 425/451.3 |
| 6,460,721 | B2 | * | 10/2002 | Bowen et al. .............. 220/586 |

\* cited by examiner

Primary Examiner—Joseph C. Merek
(74) Attorney, Agent, or Firm—Young & Thompson

(57) ABSTRACT

A process for the production of a vessel for high pressure gas, particularly helium, for a space launcher or for a satellite with a short lifetime, includes the steps of: a production of an internal skin of a plastic material selected from polyethylene and crystallized polyamide, a winding a reinforcement of fibers and resins, and a providing the obtained vessel with the necessary conduits and control valves.

5 Claims, 1 Drawing Sheet

PROCESS FOR THE PRODUCTION OF A HIGH PRESSURE VESSEL PARTICULARLY FOR A SPACE ENGINE AND VESSEL OBTAINED THERBY

BACKGROUND OF THE INVENTION

The present invention relates to vessels for high pressure gas used in space engines, launchers, satellites, probes, . . .

Space launchers have vessels containing products adapted to be pressurized or emptied, such as fuels of the fusing type. To do this, there are used vessels of high pressure gas which permit carrying out the pressurization or emptying. This avoids mechanical systems and such arrangements permit very rapid actions, very precise and requiring control means based on electrovalves, which is less consumptive of energy and involves minimum added weight.

The vector gas under pressure should have particular characteristic such as light weight, absence of risk of combustion. Because of this, helium is preferably used, particularly compared to hydrogen as to the absence of risk of explosion or fire.

Nevertheless, for certain applications, nitrogen, oxygen or rare gases, neon, xenon can be envisaged.

These vessels have a shape which is spherical, cylindrical-spherical, cylindrical-elliptical or torric.

Another interest of these vessels under high pressure is to permit the use of detectors to determine the volume of product contained in the principal vessel, for example the quantity of fusing fuel in the case of the combustible.

Thus, these vessels have a portion of their contents consumed during launching for example and then the remaining portion serves for the other maneuvers and the supply of other motors. Also, it is very useful to determine the remaining quantity and hence the duration of the remaining life, this in an easy fashion starting with temperature and pressure measurements.

French patent application FR-A-2 730 831 discloses such an arrangement in the general framework of a device for pressurizing a subsystem for the propulsion of a geostationary satellite.

The production of vessels fulfilling these requirements is not simple and at present, the vessels are entirely metallic, or of composite material with an internal metallic skin which serves as a core and an external filamentary winding of resin-impregnated fibers.

The advantage of the latter embodiment is weight saving for identical mechanical performance.

An example is given in U.S. Pat. No. 5,822,838, which discloses a process for the production of vessels in titanium alloy with a composite graphite/exopy covering.

In the case of these composite vessels, the internal skin is of metal and performs several functions.

It constitutes an envelope sealed to gases and particularly to helium whose molecules are known to be of very small diameter and which escape most materials with a high rate of loss. Only certain metal alloys are proof against such high diffusion.

The internal skin also serves as a core for winding and absorbs the mechanical stresses during these operations of depositing fibers and pulmerization of the resins.

The internal skin is also used as an anchoring point for the securement of the final vessel so as to ensure the mounting on the structure of the launcher.

On the other hand, such vessels have numerous drawbacks because their production is very sensitive.

Thus, the process of production consists in starting with a rough blank of considerable thickness which is forged, machining to reduce its thickness, which requires a very long time for machining, a high consumption of precious material of which a large part ends as machining scrap.

The parts are then assembled by equatorial welding by electron bombardment. Such an equatorial welding by electronic bombarding is difficult and costly.

Also, a metallic framework of this type constitutes substantially half the cost of the final vessel.

On the other hand, changing material is not simple. When searching among other metals or metallic alloys, one is always faced with a production process which remains complicated because there are hardly alternatives to forging and machining, at least for large vessels of the order of one meter in diameter. Moreover, there can arise problems of compatibility with the gases, which leads to producers selecting titanium as the material, although it is of high cost.

An alternative would be to use plastic materials whose cost of use is much less. On the other hand, if the plastic materials are known, it is also known that they are permeable to gases of high diffusivity such as helium and the amount of loss is prohibitive, in particular for operations of long duration such as satellites whose lifetime is often of the order of 10 to 15 years or even more.

Thus, in this case, not only the pressure decreases too much but the loses of gas can impair the environment of the satellite and particularly the onboard apparatus.

The document EP-0 465 252 discloses a vessel comprising a first skin of polymer, ensuring sealing under certain circumstances. However, the vessel thus obtained does not permit the storage of gases of high diffusivity, such as helium, with an acceptable rate of loss for a storage of long duration.

SUMMARY OF THE INVENTION

According to the present invention and in the face of prejudices arising from the technical solutions used, we have recourse to plastic materials for the production of the internal skin of a vessel, made of a particular material, permitting obtaining a rate of loss compatible with the uses such as long life satellites or probes.

To this end, the invention has for its object a process for the production of a vessel for high pressure gas, particularly helium, comprising at least one filling and emptying hole, characterized in that it comprises the following steps:

producing by extrusion/blowing an internal skin of a plastic material selected from crystalline polyethylene and polyamide, so as to obtain regions of localized minimum thickness, emplacing at least one metallic insert adapted to receive a portion of the regions of lesser thickness, winding a reinforcement of fiber and resin, polymerization, and providing the obtained vessel with the necessary conduits and control valves.

Preferably, for production by extrusion/blowing, there is used a mold whose joint plane corresponds to the equator of the vessel so as to obtain two thickened portions forming stiffeners between the two poles, the inserts being disposed at the two poles.

Preferably, there is used a resin with a high coefficient of elongation, preferably greater than 8%.

The polymerization is carried out by slow temperature increase to a level comprised between 80 and 120° C. for several hours with equally slow cooling.

According to the invention, there is obtained a rate of loss of helium less than $5\times10^{-9}$ Nm$^3$/s or a mean permeability of $1.16\times10^{-13}$ Nm$^2$/bar/s thanks:

- to the control of the minimum value of thickness of the internal skin,
- to the arrangement of the regions of reduced thickness at the poles of the vessel which are clad with metallic inserts,
- to the construction of the reinforcement obtained from a homogeneous composite, wound to a high thickness and using a resin of high elongation, and
- to the method of polymerization of the composite which permits decreasing the internal porosity of the reinforcing structure.

BRIEF DESCRIPTION OF THE DRAWINGS

The production process for a vessel under high pressure such as that of a space launcher will now be described in detail, according to a particular embodiment which is non-limiting, with reference to the accompanying drawings, in which.

DETAILED DESCRIPTION OF THE PREFERRED EMBODIMENTS

Figure 3:
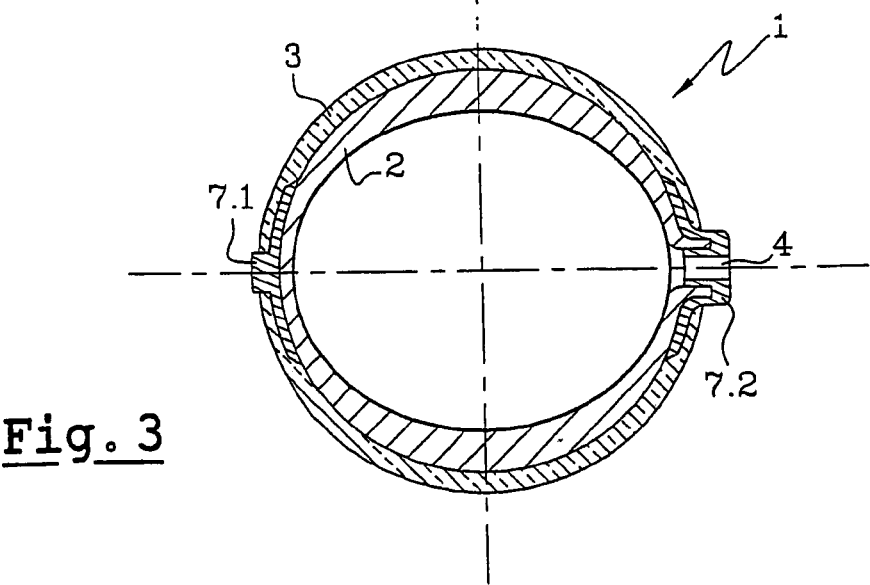
FIG. 3 is a cross-sectional view of the vessel according to the invention.

In FIG. 3, there is shown a vessel 1 according to the invention comprising an internal skin 2 clad with a winding of reinforcement 3 as well as an emptying and filling hole 4.

The process consists in producing a vessel with an internal skin of plastic material which has a mass at most equal to that of a vessel with an internal metallic skin, an acceptable rate of loss, below $5\times10^{-9}$ Nm$^3$/s or a mean permeability of $1.16\times10^{-13}$ Nm$^2$/bar/s.

The process therefore uses plastic materials which have a minimum of sites favorable to the passage of molecules of gas and more particularly of helium with very high diffusivity.

Also, the process consists in using polyethylene or crystallized polyamide which give the desired results.

There can be cited as a commercial product, semicrystallized polyamide PA6 of the type EMS Grillon R50HNZ.

Such a product has the following properties:
density between 1.13 and 1.15,
young's modulus comprised between 1 and 2 Gpa
elongation at rupture in tension: 25 to 35% at $-40°$ C. 50 to 300% at 23° C.
stress at rupture in tension: 100 Mpa at $-40°$ C., 55 to 70 Mpa at 23° C.
melting temperature: 220° C.

To produce the internal skin 2, the process of shaping is of the extrusion/blowing type.

There is first produced a cylinder of a thickness suitable for the product to be produced. This cylinder is then pressed against the walls of a mold, by blowing.

According to the invention, the mold is in two parts, 5.1 and 5.2, the joint plane 5.3 corresponding to the equator of the vessel, the hole 4 for filling and emptying provided at one of the poles of the vessel 1 being disposed in one of the two parts.

Because of this passage from a cylinder to a sphere, there is obtained a minimum thickness at all points on a correctly controlled sphere, corresponding to an average of 5 mm.

Thus, the rate of loss being substantially a function of the thickness of the internal skin, this thickness is controlled so as to control the rate of loss.

Figure 1:
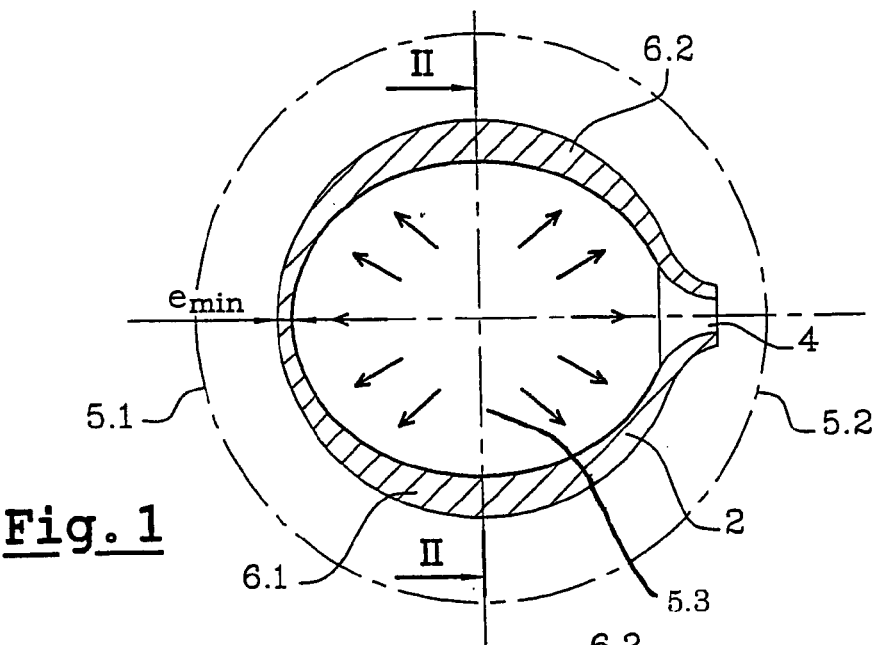
FIG. 1 is a cross-sectional view of the internal skin during its shaping by using an extrusion-blowing technique.
Figure 2:
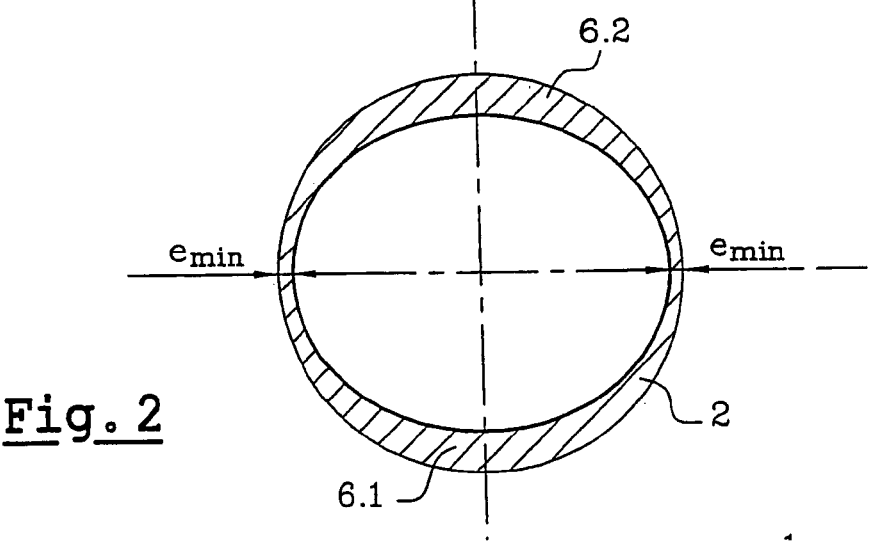
FIG. 2 is a cross-sectional view of the internal skin along the equatorial plane indicated by the line II—II in FIG. 1.

As can be seen in FIGS. 1 and 2, the least thicknesses are disposed particularly at the poles which will be covered in part by perfectly leak-proof metallic members, as will be explained later.

Thus, by selectively arranging the regions of least thickness, particularly at the poles, the rate of loss can be even better controlled and the area of the zones of least thickness can be better controlled.

Finally, according to this embodiment, at least two meridians have a greater thickness than the rest of the internal skin, forming two stiffeners 6.1 and 6.2, attribute to improving the thickness of the internal skin of plastic material, particularly during the winding phase, as will be explained later.

Preliminarily to the winding phase, there is placed at the poles of the vessel metallic inserts 7.1 and 7.2 required for winding, particularly according to the teaching of the patent FR 2.744.517.

Preferably, the outer surface of the internal skin 2 is degreased and covered with a film of adhesive. This film of adhesive contributes to reducing the rate of loss by improving the adherence of the reinforcing winding 3 on said internal skin 2.

According to a preferred embodiment, the winding is carried out with carbon fiber, for example of the type T 800 of TORAY®, with 12,000 filaments, not twisted.

This fiber has been first pre-impregnated, at a quantity of about 30%, with a resin having an elongation preferably greater than 8%, such as the resin B14 M15 of EADS®. According to a preferred embodiment, the fibers are pre-impregnated 2 by 2 and the fibers containing 24,000 filaments are disposed 6 by 6.

Contrary to the reinforcing structure of the prior art, which is porous and has no sealing function, the reinforcing structure of the invention because of the materials used, particularly the resin with a high coefficient of elongation, contributes to improving the sealing of the vessel.

The winding takes place at a speed of the order of 1 m/s, each layer having a thickness of the order of 0.6 mm. Preferably, the winding is of the planary type, the fibers in contact with each other and the tension is at most 4 daN per strand, to give an order of magnitude.

Other materials such as those based on aramide fibers sold under the name "Kevlar" or based on glass fibers sold under the name "Vetrotex" can be used.

To form the matrix, there can be used other types of resin having a high coefficient of elongation greater than 8%, preferably greater than 11% and desirably of the order of 14% or more.

The polymerization is carried out by slow increase of the temperature to a range comprised between 80 and 120° C. for several hours, with equally slow cooling.

During winding, the internal skin 2 is subjected to an internal pressure so as to obtain a relative pressure of the order of 1 to 2 bars to limit the deformations that may be produced by winding. Moreover, thanks to the presence of stiffeners 6.1 and 6.2 constituting reinforcements between inserts 7.1 and 7.2, the tension forces arising from winding do not induce deformations.

The vessel thus obtained is then provided with conduits and other control valves necessary to connect such a vessel.

Thus, according to the invention, the sealing of the vessel 1 is obtained thanks:
- to controlling the minimum value of the thickness of the internal skin,
- to the arrangement of the regions of low thickness at the poles of the vessel which are covered by metallic inserts,
- to the reinforcing structure obtained from a homogeneous composite, wound to a substantial thickness and using a resin of high elongation, and
- to the method of polymerization of the composite which permits decreasing the internal porosity of the reinforcing structure.

So as to give a specific example, there can be cited the characteristics of such a vessel.

In the Ariane 5 launcher, there are provided several vessels.

These vessels have a spherical shape, and according to a known example, they have an internal diameter of 800 to 900 mm and a volume of 300 liters with an internal pressure of 400 bar. The acceptable pressure loss is 0.1 bar per 48 hours. Moreover, it should be noted that in the case of the launcher, such losses of gas are minimal compared to the environment during launching and they do not risk polluting the environment of the launcher as in the case of satellites.

For an internal skin having the dimensions mentioned above, provided with its attachments, there are thus obtained the following parameters:
- weight of about 12 kg instead of 18 kg for an internal skin of titanium alloy, in the case of a vessel of 81 kg,
- an internal skin thickness of at least 5 mm over all the internal skin,
- a winding thickness of 16 mm
- a gas loss less than $5 \times 10^{-9}$ Nm$^3$/s,
- a resistance to pressure greater than 800 bar at rupture.

Such vessels can also be used with less diffusive gases than helium, the quantity of loss being less.

There can also be used such vessels for hydraulic fluids as in the groups of activation nozzles of the powder acceleration stages in launchers such as Arian 5. At present such vessels are made with an internal skin of steel with a winding of composite material.

By way of example, a vessel provided for a geostationary satellite of 90 liters in volume and 43 cm diameter weighs 18 Kg with an internal skin of 4 mm thick, a surface pressure of 300 Bar, a bursting pressure of 450 Bar and a rate of loss of $5 \times 10^{-9}$ Nm$^3$/s at the, service pressure.

The vessels obtained according to the invention are more particularly adapted for the space field with a utilization pressure greater than half the bursting pressure, which corresponds to a coefficient of safety factor less than or equal to 2.

To dimension these vessels, in a first step, a vessel is dimensioned with an internal skin of titanium adapted to support the stresses, particularly the thickness of the titanium skin. Knowing the ratio between the density of titanium and the plastic material used, the thickness of the internal skin of plastic material can be determined so as to obtain a vessel of substantially the same weight.

To measure the quantity of loss, the vessel pressurized with a gas, particularly helium, is placed in a vacuum chamber. Between a vacuum pump and the chamber, a mass spectrometer permits continuously measuring the quantity of gas, particularly helium, passing through it and escaping from the vessel.

The quantity of loss measured for the utilization pressure is of the order of $5 \times 10^{-9}$ Nm$^3$/s, which corresponds to a surface permeability of the order of $5.8 \times 10^{-12}$ Nm/Bar/s or a mean permeability of the order of $1.16 \times 10^{-13}$ Nm/Bar/s.

Finally, as a modification, the vessel can comprise several filling and emptying holes disposed at the poles of the vessel, corresponding to the zones of least thickness of the internal skin.

What is claimed is:

1. Process for the production of a vessel for high pressure gas, comprising at least one filling and emptying hole, comprising the steps of:
   producing by extrusion and blowing an internal skin of a plastic material selected from the group consisting of polyethylenes and crystallized polyamides, said producing being carried out with a mold having a joint plane corresponding to an equator of the vessel and so as to obtain an internal skin with regions of lesser thickness at two poles than at said equator, said filling and emptying hole being disposed at one of said two poles;
   emplacing a metallic insert at an external surface of said internal skin at each of said two poles;
   winding a reinforcement of fiber and resin onto said external skin and metallic inserts; and
   polymerization.

2. Process for the production of a vessel according to claim 1, wherein said resin is a resin with a coefficient of elongation greater than 8%.

3. Process for the production of a vessel according to claim 1, wherein the internal skin is subjected to an internal pressure during winding.

4. The process according to claim 1, further comprising the step of covering the internal skin with a film of adhesive prior to said winding step.

5. The process according to claim 1, wherein said high pressure gas is helium.

* * * * *